United States Patent [19]

Bridenbaugh

[11] 4,101,735
[45] Jul. 18, 1978

[54] TWO-WAY LOUDSPEAKING DEVICE FOR TELEPHONE STATIONS

[75] Inventor: Edwin Redmond Bridenbaugh, Corinth, Miss.

[73] Assignee: International Telephone and Telegraph Corporation, New York, N.Y.

[21] Appl. No.: 779,486

[22] Filed: Mar. 21, 1977

Related U.S. Application Data

[63] Continuation of Ser. No. 591,455, Jun. 30, 1975, abandoned.

[51] Int. Cl.² ............................................. H04M 9/08
[52] U.S. Cl. .................................................. 179/1 HF
[58] Field of Search ................. 179/1 HF, 1 H, 1 VC

[56] References Cited

U.S. PATENT DOCUMENTS

| | | | |
|---|---|---|---|
| 2,819,340 | 1/1958 | Brody | 179/1 HF |
| 3,030,445 | 4/1962 | Hitch et al. | 179/1 HF |
| 3,499,115 | 3/1970 | Sontag | 179/1 H |
| 3,725,585 | 3/1972 | Moniak | 179/1 HF |
| 3,849,603 | 11/1974 | Proios | 179/1 H |
| 3,904,834 | 9/1975 | Shinoi et al. | 179/1 HF |

Primary Examiner—Thomas W. Brown
Assistant Examiner—E. S. Kemeny
Attorney, Agent, or Firm—James B. Raden; Marvin M. Chaban

[57] ABSTRACT

A handsfree telephone set uses a single transducer as microphone and speaker. A switching arrangement senses and compares the relative strength between received and transmit signals, and switches signal paths accordingly. By sensing the input of the receive path versus the output of the transmit path, the detectors are thus asymmetrically coupled, to provide a break-in capability from one side (the telephone central or calling party) only.

7 Claims, 4 Drawing Figures

TWO-WAY LOUDSPEAKING DEVICE FOR TELEPHONE STATIONS

This is a continuation, of application Ser. No. 591,455 filed 6/30/75, now abandoned.

BACKGROUND OF THE INVENTION

Handsfree or loudspeaking telephone devices are wellknown. Such devices generally use two transducers, one as the speaker and the other as the microphone. The two transducers must be acoustically decoupled to prevent positive feedback or singing. In the usual case, voice switching in one direction is controlled by the stronger signal with signals in the weaker direction being attenuated to minimize and reduce their effects.

An example of a similar system for a handsfree telephone is shown by U.S. Pat. No. 3,725,585, issued Apr. 3, 1973, of which I am a joint inventor. In that patent, signals at the voice frequency level from each direction are compared within an operational amplifier to cause the stronger signal to be amplified and the weaker signal attenuated. Two transducers are used, acoustically decoupled.

Call announcing key systems are a recent innovation in the field of telephony. Their advantages over previous key system designs lie in the speed and efficiency with which calls can be handled within a group. In the usual system, a connection from an attendant to a called station within a key group is provided only for one-way paging or announcing. That is, an attendant announced to the called party that he was wanted in a meeting or that he had an outside call waiting, but the attendant did not know whether anyone was at the location to hear the announcement unless some definite, proper response resulted.

SUMMARY OF THE INVENTION

This disclosure describes a two-way handsfree audio circuit which employs a single transducer for microphone and loudspeaking functions. The circuit may preferably be used with a key system, but need not be so limited.

The circuit is similar in many ways to other handsfree telephone circuits but varies in several distinct ways. First, it overcomes the acoustic coupling problem inherent in loudspeaking telephones where a microphone and speaker are placed in close proximity. In this invention, the speaker is used for both purposes, i.e., speaker and microphone. The second distinction lies in the method used to couple the circuit to the telephone line. Because the circuit is designed to be used with key systems or other predictable line loop conditions, the line coupling circuitry is reduced to a simple resistive attenuator coupled with tracking rectifiers to provide transmit/receive isolation.

A major advantage of this circuitry over present art is that by employing a single transducer for transmission and reception duties, acoustic coupling problems are eliminated. The size of the call announcer unit as described herein is dictated solely by the physical size of the components themselves. The size can be made as small or as large as circumstances or needs dictate.

The present invention also adds measurably to the speed and efficiency of call announcing by providing two-way tone signalling, voice path. In this way, the called party may respond verbally to the call and so informing the attendant.

The unit also may be used as a handsfree intercom or bi-directional paging amplifier.

It is therefore an object of my invention to provide for use a bi-directional voice frequency circuit using a single transducer for use both as a speaker and as a microphone.

It is a further object of my invention to provide a loud-speaking device which may be used with a telephone including a bi-directional, voice-switched control circuit employing a single transducer for both directions of voice frequency transmission.

It is a further object of my invention to provide a special purpose telephone attachment for providing two-way voice switched communication which normally reverts to the transmit condition.

Other objects, features and advantages of the invention will become apparent from the accompanying drawings taken in conjunction with the ensuing specification.

DETAILED DESCRIPTION

Figure 1:
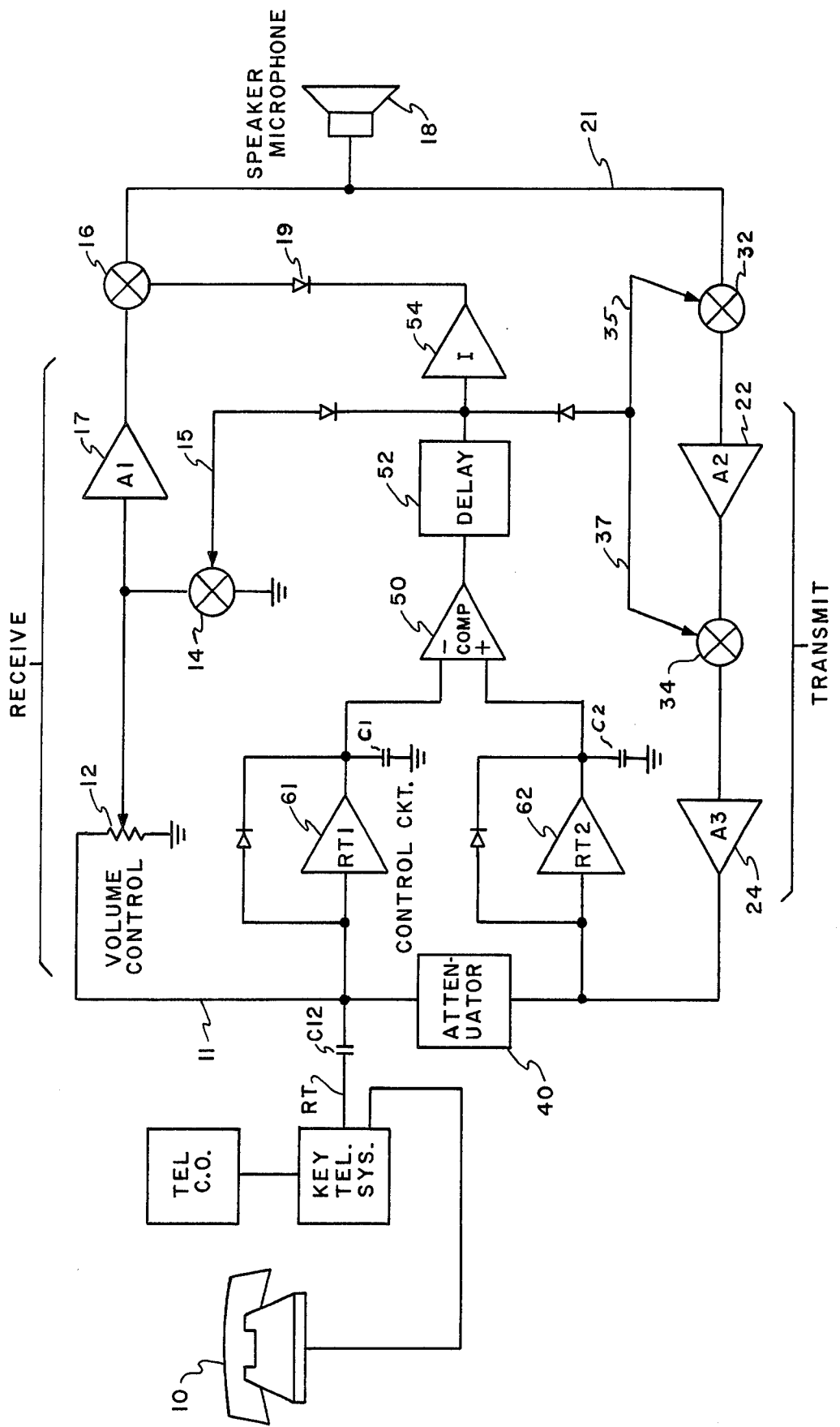
FIG. 1 is a schematic block diagram of a circuit using my invention.

The apparatus shown in FIG. 1 is a bi-directional voice frequency circuit used as a handsfree intercom, speakerphone or call announcer circuit, preferably used in conjunction with a telephone instrument 10. The Call Announcer may be connected to a telephone system as shown via its RT lead. The circuit provides a reception path 11 from a telephone system which may include Key Telephone apparatus, the path including a volume control 12, audio amplifier A1, two gates or switches 14 and 16 (which may be field effect transistors) and a transducer 18. The switches or field effect transistors (FET's) 14 and 16 act as switching attenuators on either side of the amplifier 17 and allow speech signals to pass uninhibited when the receive channel is active and effectively shuts off the receive signal during the inactive state. These switches are gated by the respective leads 15 and 19 as indicated by the arrows at the junction of the leads and the respective switches.

The transmission path 21 uses the transducer 18 to convert audio acoustic energy into electrical energy, thereby allowing the transducer to act as a microphone. The speaker is followed in the transmit path by two amplifiers 22 and 24 which are preceded by two switches or gates 32 and 34 gated from leads 35 and 37 respectively to provide signals to the line to the key telephone system through a resistive attenuator 40. The switches 32 and 34 may also be FET's positioned in the transmit channel 21 to work in opposition to those in the receive channel 11 allowing alternate transmission or reception—but not simultaneously. The state of the switches are controlled by control circuitry made up of operational amplifiers 61 and 62, comparator 50, hold-on delay 52 and by inverter 54 over the gating leads 15, 19, 35 and 37.

In FIG. 1, I show the switch 14 between the input to amplifier 17 and ground such that the input is shunted to ground on closure of the switch. Alternatively, the switch 14 could be in series with the input to amplifier 17 and operated with switch 16 to achieve a similar effect.

The operational amplifiers 61 and 62, both of which act as rectifiers (62 being the rectifier for the transmit direction and 61 being the rectifier for the receive direction) convert the audio electrical signal into a DC signal proportional to the amplitude of the AC signal. The capacitors C1 and C2 at the output from the rectifiers 61 and 62 store amplitude of the AC signals as a DC level. The comparator 50 compares the amplitude of the rectifier outputs differentially and it switches the receive switch 16 to its "on" condition and switches 14, 32 and 34 to the "off" condition when the DC level at C1 is more positive than C2 and vice versa.

When the unit of FIG. 1 is in the transmit state, (the normal state with switches 32 and 34 closed to complete the transmit path) a signal output from amplifier 24 is present at the input to rectifier 62, and at the input to receive rectifier 61 — but at a slightly lower level due to voltage drop across the attenuator 40. The gain and frequency response characteristics of rectifiers 61 and 62 are chosen so that the DC signal due to transmit, at the output of amplifier 61 is always smaller than that of amplifier 62 by a predictable amount. This tracking of amplifiers 61 and 62 prevents the unit from switching into the receive mode during transmit.

Although the receive rectifier 61 responds to transmit signals in the manner described above, the converse is not true. Rectifier 62 is not responsive to receive signals appearing at RT because of the voltage division caused by attenuator 40 and the extremely low output resistance of amplifier 24.

The combination of tracking rectifiers 61 and 62 and comparator 50 constitutes a simplified voice switching sensing and control circuit and is an important part of this invention.

In the absence of receive signals on the line, it is necessary for the circuit to revert to the transmit state. For this purpose, a small DC voltage bias is applied to rectifier 62 so that under no receive signal conditions on the Key System receive lead RT, the voltage level at rectifier 62 is greater than that at rectifier 61 and the comparator 50 causes the unit to switch to the transmit state. The amount of DC bias applied to rectifier 62 determines the receive threshold—that signal level necessary to cause the unit to switch to the receive state.

Signals received from the key systen pass through rectifier 61 and are compared in comparator 50 with signals from the transmit path. When the received signals are greater, gates 14, 32 and 34 are switched to their open circuit condition and gate 16 is closed to complete the receive path to transducer 18 which acts as a speaker to emit the received signals audibly.

A hold-on delay circuit 52 is included in the circuit to maintain the unit in the receive state for approximately 300 milliseconds after conclusion of the receive signal to provide continuity of speech during normal speech pauses and to prevent final consonant clipping.

In order to ensure stable operation and freedom from oscillations, total attenuation around the audio gain loop developed by attenuating gates 32 and 34, or 14 and 16 is always greater than the gain produced by amplifiers 17, 22 and 24 at any instant. The turn-on and turn-off of the gates 14, 16 32, and 34 is timed to guarantee the turn-off of any active channel prior to the turn-on of the other.

Figure 2:
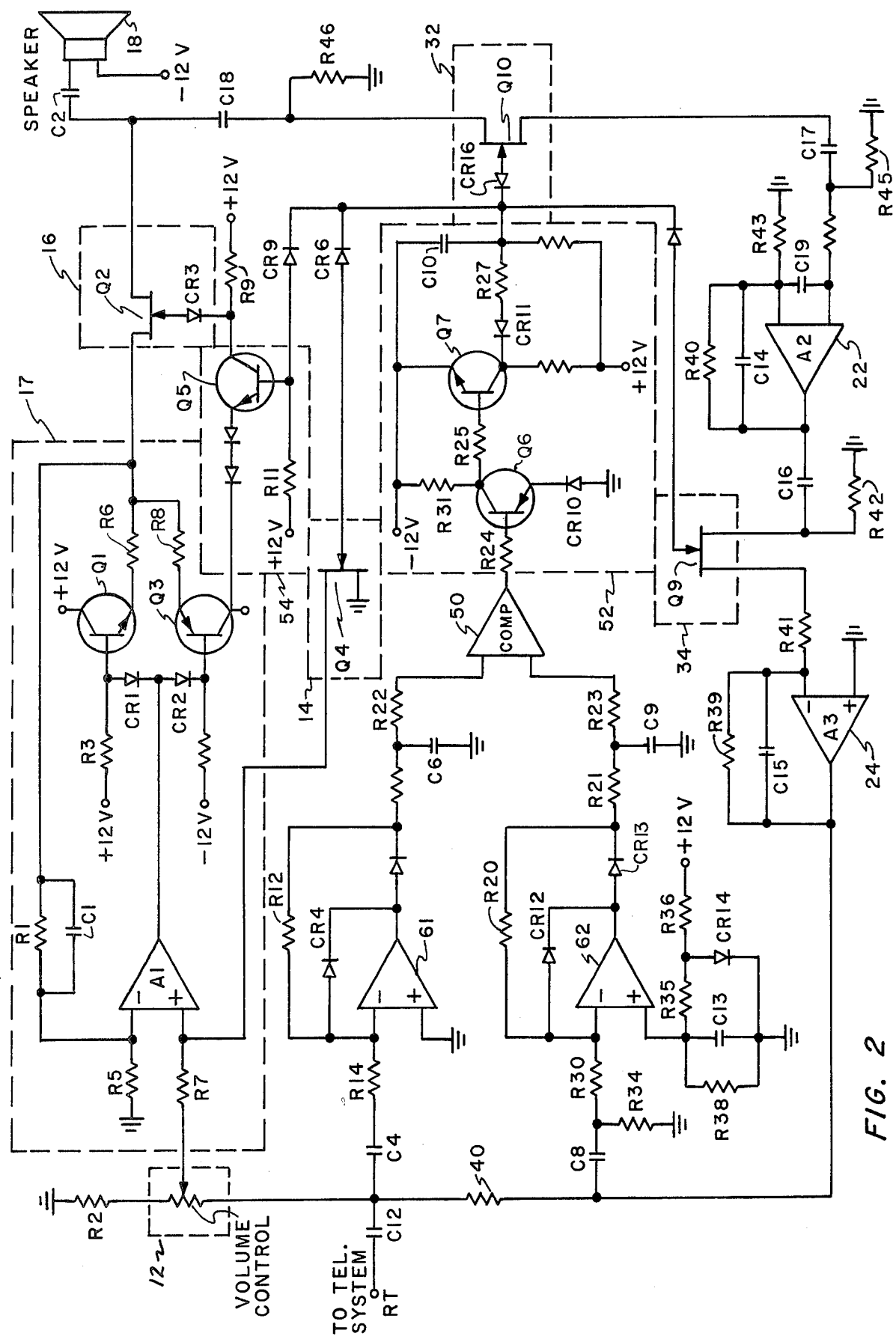
FIG 2 is a more detailed showing of the circuit of FIG. 2.

In FIG. 2, I shown in greater detail, a circuit employing the principle shown by FIG. 1. In FIG. 2, there is shown the RT lead which provides the bi-directional speech signal path. The RT lead is capacitively coupled to the telephone system through capacitor C12, which provides DC blocking and low frequency attenuation.

An incoming signal is coupled through DC blocking capacitor C12 to the junction of the input to the receive rectifier capacitor at C4, the attenuator 40, and the volume control 12. At the volume control potentiometer 12, the desired receive audio level is selected and the signal is passed through resistor R7 to the non-inverting input of the receive operational amplifier A1 and to gate Q4 (14). Gate Q4 along with resistor R7 form a switched attenuator which shunts the majority of the receive signal to ground when the gate is switched on, and provides little or no attenuation to the receive path when the gate is switched off.

Amplifier A1 provides voltage amplification of receive signals in the operational amplifier stage and provides power gain in the stage comprised of transistors Q1 and Q3 connected as complementary emitter followers. Diodes CR1 an CR2 as well as resistors R8 and R6 compensate for the Vbe drop in Q1 and Q3 and provide a slight forward bias thereby preventing crossover distortion. Gain of the composite amplifier A1 is determined by the ratio of resistors R1 to R5. Amplifier A1 is followed by a series switch Q2 which may also be a FET switch.

FET Q2, when turned on presents a low-impedance signal path through capacitor C2 to the loudspeaker transducer. In its off state, FET Q2 blocks or attenuates receive signals from amplifier A1 arriving at the loudspeaker and at the same time presents a high impedance load to the loudspeaker thereby allowing it to be used as a microphone transducer. During the time that the receive path is active, gate Q2 is on and gates Q4, Q9 and Q10 are in the off state.

With no speech input on lead RT, gate Q2 is shut off by means which will be explained further, and gates Q4, Q9 and Q10 turn on reverting to the transmit ready condition.

The transmission path for speech with transducer 18 used as a microphone is as follows: Gates Q10 and Q9 in the "on" condition provide a low impedance path. The combination of capacitor C18 and resistor R46 provie a high pass filter to block DC and low frequency signals. The removal of low frequency or bass signals tends to lessen the "barrel effect" which results from an input with a heavy proportion of bass signals.

Signals from the transducer 18 pass the filter comprised of capacitor C18 and resistor R46 and pass through conducting gate Q10. Low frequencies are further attenuated by the combination of capacitor C17 and resistor R45 and signals to be transmitted pass RF capacitor C19 at one input to operational amplifier C6. It should be noted that the ratio of resistances of resistor R40 divided by that of resistor R43 forms the circuit gain ratio to amplifier A2.

Transmitted signals are amplified by amplifier A2, pass through the conducting FET Q9 with little loss and pass through amplifier A3 to attenuator 40 and the RT lead.

It should be noted at this point that series pass capacitors C2, C18 and C16 in addition to functioning as filtering devices to shape the audio frequency response characteristics, also serve to block any DC components caused by offset currents and voltages from the operational amplifiers and imperfect grounds from being switched on and off through the FET gates. This makes the switching action of the FET gates responsive only to the AC audio signals and prevents popping sounds or clicks from being transmitted to the telephone line or being output from the speaker.

When in the transmit state, as mentioned earlier, amplified speech signals from A3 are directed to capacitor C8 at the input to the transmit rectifier circuitry 62 and passed through attenuator 40 to the input/output signal lead RT and to capacitor C4 at the input to receive rectifier 61. Capacitor C8 at the input to rectifier R2 along with R34 forms a high pass filter section to remove unwanted low frequency components including DC components and makes the rectifier responsive only to AC audio signals. The rectifier is connected in the inverting configuration with diodes CR12 and CR13 as well as R20 making up the negative feedback path. When an AC signal is applied to the input resistor R30, the signal is inverted and amplified. For positive signals at the input, the inversion causes the output level to go negative to the point at which diode CR12 is forward biased, providing a low impedance negative feedback path. This has the effect of clamping the output level to $-0.7$ volts in the case of a silicon diode for positive input signals.

When the input signal at R30 goes in the negative direction, the signal at the output of the amplifier goes in a positive direction. Since the diode CR13 is now in the negative feedback path composed of CR13, and R20, the effective feed-back resistance is extremely high until the breakover point of the diode is reached. The effective gain of the rectifier is controlled by the feedback resistance composed of the sum of resistor R20 and the effective resistance of the diode CR13 divided by the input resistance R30. It can be seen that until the diode becomes forward biased, it presents a very high effective resistance thereby making the gain of the amplifier very high. The net effect of this gain is that the amplifier will perform as a half-wave rectifier for very small values of AC input voltages giving it a dynamic operating range of several orders of magnitude greater than a diode acting alone.

The addition of series resistor R21 and capacitor C9 to the output of the rectifier circuit causes the total circuit to perform similar to a peak detector. When the signal at the output of the amplifier exceeds the voltage across C9, current flows through diode CR13 and resistor R21 to chare capacitor C9. C9 continues to charge until the point is reached where diode CR13 is no longer forward biased. The rate at which capacitor C9 is charged is determined by the time constant R21, C9 (assuming the effects of diode resistance and the input resistance of the following comparator to be negligible). Once charged to the peak value of the signal or where CR13 is back biased, the discharge rate of capacitor C9 is determined by the product (R21 + R20) (C9). Normally the discharge rate would be considerably longer than the charge rate, and in practice, the charge rate is set slow enough so that the capacitor charge is relatively insensitive to transient switching spikes or noises of short duration. The discharge characteristics were set at about 100 milliseconds in practice to prevent choppiness of speech and clipping of speech syllables. The purpose of the operational rectifiers as described is to make them responsive to speech signals at a low level so that initial components of speech can be immediately recognized as a significant amplitude change at storage capacitor C9. It will be noted that the previous description of the rectifier and storage circuitry can also be applied to the receive rectifier 61 since they are identical in operation.

Rectifiers 61 and 62 convert the audio signals at their inputs into equivalent DC voltages so that a comparison of their relative amplitudes can be made on a continuing, real-time basis. The only signals that appear at the input to rectifier 62 are transmit signals from amplifier A3 since any receive signals coming in over the RT lead will be totally attenuated due to the voltage division of attenuator resistor 40 and the extremely low output impedance of A3.

Signals appearing at the input to the receive rectifier 61, however, will be the sum of receive signals from the line RT, and the slightly attenuated transmit signals passed through attenuator 40. Therefore, the DC signals being compared at the comparator will be the sum of receive and slightly attenuated transmit signals at one input, and the transmit signal at the other.

From this it can be observed that if there is no receive signal on the RT lead, then the comparator will recognize any transmit signal as being larger and switch the unit to transmit. This is true if the gains and frequency response characteristics of rectifiers 61 and 62 are identical and the loss through attenuator 40 is the only different in the two paths. However, since rectifier 61 is also responsive to receive signals, then the comparator will recognize the receive signal as being larger in amplitude if the sum of the receive signal and the attenuated transmit signal is larger than the transmit signal by itself.

The tracking and decay characteristics of the rectifiers 61 and 62 as well as the storage capacitors C6 and C9 must be closely controlled and matched as closely as possible. As previously mentioned, the operational amplifiers which comprise the rectifier circuitry are largely dependent on external component charactersitics which can be closely controlled.

The comparator differentially compares the DC signals at capacitors C6 and C9 representing transmit and receive, and switches the output level positive or negative according to the relative amplitudes of the signals. Transistor Q6 following the comparator functions as an inverter and driver to the delay circuitry controlled by transistor Q7. Transistor Q7, when biased on, provides a low impedance path to ground for any charge stored on capacitor C10. When Q7 is turned off, capacitor C10 begins charging toward +12 volts at a rate determined by the combination of R28, C10.

The gates of FETs Q4, Q9 and Q10 are connected to the juncture of R28 and C10 and the on-off operation of the FETs is controlled by the voltage at this point. This juncture is also connected to the base of transistor Q5 (54) which acts as an inverter and driver for FET Q2. When the comparator recognizes that the receive signal is larger than the transmit signal, it produces a negative voltage at its output, turning on transistor Q6 and causing the collector to go positive relative to the base-emitter junction of the following transistor Q7, causing it to turn on. The collector of Q7 immediately goes to $-12$ volts and provides a low impedance discharge path for any voltage stored on capacitor C10 and rapidly discharges it toward $-12$ volts. As the voltage at the juncture of R28, C10 and the FET gates goes toward the negative voltage, FETs Q4, Q9 and Q10 turn off.

Because of the inverter Q5, FET Q2 turns on, thus establishing the receive state. The receive state is maintained until the comparator recognizes the transmit level as being greater than the receive level. At that time Q6 and Q7 turn off and C10 starts charging toward +12 volts. The time required for the voltage on capacitor C10 to to charge up to the level at which FETs Q4, Q9, and Q10 turn on and Q2 turns off is the hold-on-delay time that prevents final consonant clipping due to normal speech pauses. The capacitor continues to charge toward a more positive voltage ensuring that the transmit FETs are fully turned on and the receive FETs are providing the shunting or blocking functions as required to the receive signal.

In the circuit as shown in FIG. 2, it will be observed that when in the transmit mode of operation, receive break-in is possible by receive signals appearing at the RT lead of sufficient magnitude to cause the comparator to recognize the receive as being larger in amplitude than transmit. When this occurs, the unit will instantly switch to receive. The converse is not true. When in the receive mode, no transmit break-in is possible because the speaker is functioning as a loudspeaker, and for all practical purposes the transmit amplifiers are switched off. Therefore, means are provided to allow the unit to revert to the transmit mode in the absence of receive signals. This is accomplished by the bias circuit shown connected to the non-inverting input of the transmit rectifier. The bias circuit introduces a small DC offset voltage to the rectifier and the capacitor C9 to simulate the effect a small transmit signal would have if one were available. Therefore, at the conclusion of a receive signal, capacitor C6 discharges to its quiescent, no-signal condition at some level lower than the DC signal established at capacitor C9. The comparator will see this "artificial" transmit signal on C9 and will cause the set to revert to the transmit state after suitable and proper delays as mentioned previously. The artificial transmit bias also establishes the minimum receive signal level necessary to cause the set to switch to the receive mode of operation. This level is known as the receive threshold level and is normally set low enough so that no receive or first consonant clipping results. It is also necessary to set it high enough so that spurious electrical noises do not cause the set to switch to receive. In practice it is found that when used with a key system on short, predictable line lengths, a receive threshold on the order of −40 dB reference one volt is usually acceptable.

Figure 3:
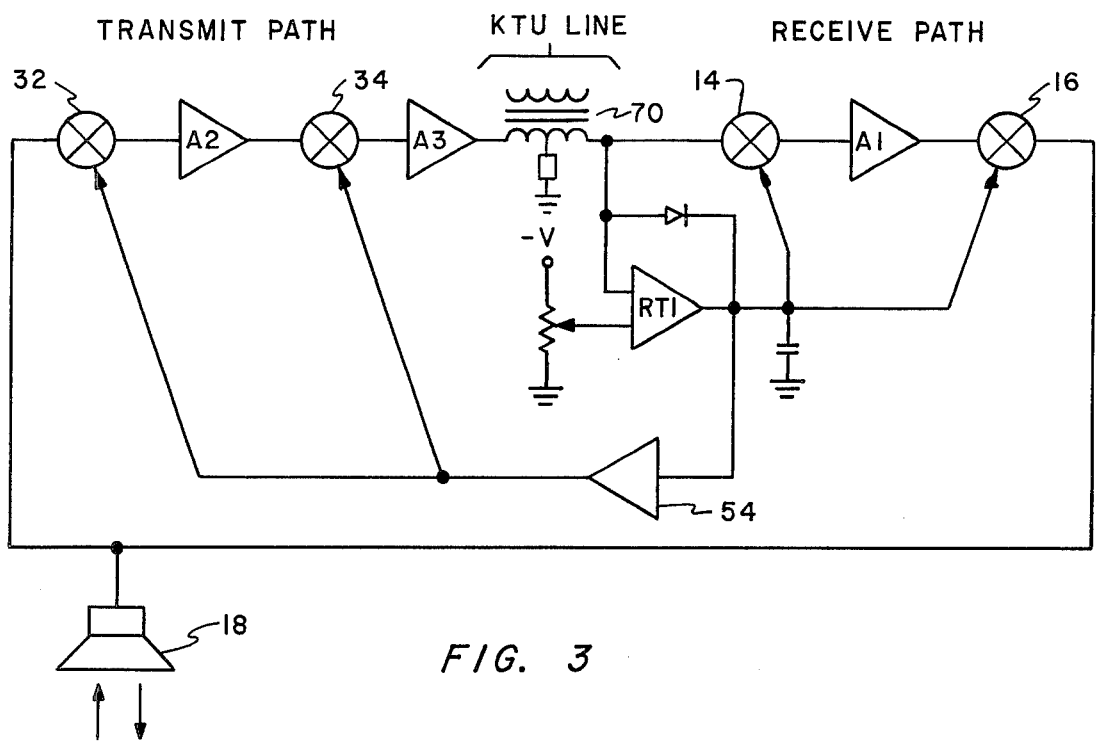
FIG. 3 is a schematic block diagram of a circuit (like FIG. 1) showing an embodiment of the invention leading to the development of the embodiment of FIGS. 1 and 2.
Figure 4:
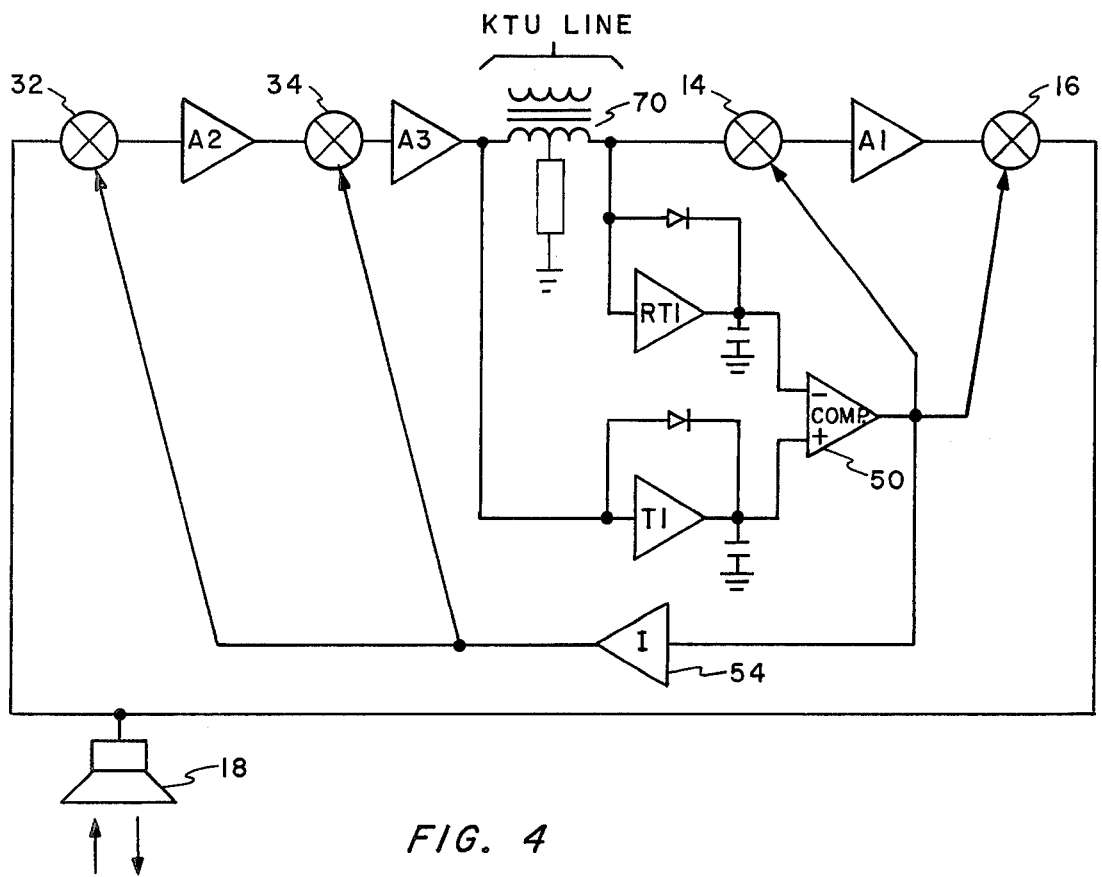
FIG. 4 is a block diagram like FIG. 3 of a second embodiment of the development leading to the embodiment of FIGS. 1 and 2.

FIGS. 3 and 4 represent an intermediate step in the development of the circuit of FIGS. 1 and 2 employing a hybrid 70, these drawings being shown to point up the concept used by the invention.

The most difficult part of designing the present circuit arose in finding a hybrid transformer (or active circuit) which would provide adequate signal strength to the line yet with enough trans-hybrid loss to prevent the circuit from switching into receive when transmitting. It can be seen from FIG. 3 that when the set is in the transmit state and speech is being amplified by transmit amplifier A2 and A3 that if the speech level is great enough and if the trans-hybrid loss through hybrid 70 is too small, the signal at receive rectifier RT1 will exceed the receive threshold and cause the set to switch to the receive state. The trans-hybrid loss must be adequate and predictable for any combination of line lengths, impedances and frequencies.

It was considered that if a circuit were developed which would increase the receive switching threshold as a function of the transmit signal then effectively the trans-hybrid loss had been increased. To do this, a transmit rectifier circuit (T1) was placed ahead of the hybrid as shown in FIG. 4. This rectifier T1 rectified the transmit signal and used it to increase the level the receive rectifier must have before the set could be switched to the receive state.

This concept was carried a step further. If the two rectifiers had identical gain and frequency characteristics, then theoretically the circuit could never switch to its receive state due to a strong transmit signal because the "tracking" characteristics of the two rectifiers would always place the receive threshold "just out of reach" as far as the transmit signal was concerned. This technique worked so well that the hybrid transformer 70 could be eliminated and only a small resistive attenuation (designated 40 in FIG. 1) was required to ensure that the transmit signal, as seen by the receive rectifier, was less than that seen by the transmit rectifier, thereby mantaining the transmit state.

As far as the switching characteristics are concerned, the "tracking rectifier" concept shown in FIGS. 1 and 2 provides adequate trans-hybrid loss for any line length, impedance, or frequency, as long as all circuits are operated in the linear-nonsaturated mode.

I claim:

1. An audio signal controlled switching circuit for interfacing between a telecommunications system and a bidirectional transducer, said circuit including a first unidirectional audio path coupled at its input to receive audio signals from said system and coupled at its output to said transducer to transmit signals to said transducer, a second unidirectional audio path coupled at its input to the transducer and at its output to the system, switching means for enabling transmission of signals through one or the other of said paths on operation thereof, a comparator network having a first and a second input means for comparing signals in said audio paths for operating the switching means responsive to audio signal received from said paths to enable the audio path from which signals of greater amplitude have been received by comparator network and to disable the other audio path, said first input means coupled to said system to continuously receive signals directed to said first audio path, said second input means coupled to the output of said second audio path to receive signals therefrom only with said first audio path disabled by said switching means whereby to provide signals to said switching means to enable said first audio path on the occurrence of signals of greater amplitude from said system than those transmitted from said second audio path.

2. A circuit as claimed in claim 1, in which the output coupling of said second audio path is further coupled to said system and to said first input means through signal attenuating means.

3. A switching circuit as claimed in claim 1, in which said second input operational amplifier with one input to said amplifier coupled to the output of said second audio path and in which the second input to said amplifier has coupled thereto means for normally biasing said second input to establish a threshold level for the operation of said operational amplifier.

4. A switching circuit as claimed in claim 1, in which said first and second input means each comprises an operational amplifier for rectifying an audio signal received to produce direct current signals for said comparator network.

5. A loudspeaking telephone circuit for selectively transmitting audio signals between a telephone system and a bidirectional transducer comprising:
   first and second audio paths coupling said system and said transducer, switching means operative to enable one of said audio paths and disable the other of said audio paths;
   first means for detecting audio signals from said telephone system and for operating said switching means to enable said first audio path and inhibit said second audio path when said telephone system audio signals are above a first predetermined level, and second means for detecting audio signals from said telephone system and from said transducer for operating said switching means to enable said second audio path and inhibit said first audio path when said transducer audio signals are above a second predetermined level and said telephone system audio signals are below said first predetermined level.

6. A loudspeaking telephone circuit as claimed in claim 5, in which each said detecting means comprises a rectifying amplifier for feeding direct current signals to said switching means for comparison of amplitude of signals.

7. A loudspeaking telephone system as claimed in claim 6, in which said switching means comprises an operational amplifier acting as a comparator for controlling individual switching elements for each of said audio paths.

* * * * *